United States Patent
Yang (10) Patent No.: US 10,293,636 B2
(45) Date of Patent: May 21, 2019

(54) WHEEL END ASSEMBLY HAVING A DEFLECTOR

(71) Applicant: ArvinMeritor Technology, LLC, Troy, MI (US)

(72) Inventor: Kou Yang, Warren, MI (US)

(73) Assignee: ArvinMeritor Technology, LLC, Troy, MI (US)

(*) Notice: Subject to any disclaimer, the term of this patent is extended or adjusted under 35 U.S.C. 154(b) by 84 days.

(21) Appl. No.: 15/585,262

(22) Filed: May 3, 2017

(65) Prior Publication Data

US 2018/0319211 A1 Nov. 8, 2018

(51) Int. Cl.
| | |
|---|---|
| *B62D 7/18* | (2006.01) |
| *B60B 27/00* | (2006.01) |
| *B60B 27/02* | (2006.01) |
| *B60B 35/00* | (2006.01) |
| *F16C 33/78* | (2006.01) |
| *F16J 15/00* | (2006.01) |
| *F16J 15/3256* | (2016.01) |
| *F16C 33/72* | (2006.01) |
| *F16C 19/38* | (2006.01) |
| *F16C 19/54* | (2006.01) |

(52) U.S. Cl.
CPC ........ *B60B 27/0073* (2013.01); *B60B 27/001* (2013.01); *B60B 27/02* (2013.01); *B60B 35/003* (2013.01); *B62D 7/18* (2013.01); *F16C 33/7886* (2013.01); *F16J 15/002* (2013.01); *F16J 15/3256* (2013.01); *B60B 2900/211* (2013.01); *B60G 2206/50* (2013.01); *F16C 19/386* (2013.01); *F16C 19/548* (2013.01); *F16C 33/723* (2013.01); *F16C 33/7883* (2013.01); *F16C 2326/02* (2013.01)

(58) Field of Classification Search
CPC ..................................................... B60B 27/003
USPC ........................................ 280/93.505, 93.512
See application file for complete search history.

(56) References Cited

U.S. PATENT DOCUMENTS

| | | |
|---|---|---|
| 3,027,975 A | 4/1962 | Erickson |
| 3,782,841 A | 1/1974 | Winckelhaus |
| 4,161,120 A | 7/1979 | Gloarec |
| 4,705,090 A | 11/1987 | Bartos |
| 4,730,656 A | 3/1988 | Goodell et al. |
| 4,733,707 A | 3/1988 | Goodell et al. |
| 4,946,296 A | 8/1990 | Oischewski |
| 5,031,967 A | 7/1991 | Svensson |

(Continued)

FOREIGN PATENT DOCUMENTS

| | | |
|---|---|---|
| DE | 102007010290 A1 | 9/2008 |
| DE | 102014106519 A1 | 11/2015 |

(Continued)

OTHER PUBLICATIONS

Extended European Search Report for European Application No. EP18170051.9-1013, dated Sep. 12, 2018, 10 pages.

(Continued)

*Primary Examiner* — Toan C To (74) *Attorney, Agent, or Firm* — Brooks Kushman P.C.

(57) ABSTRACT

A wheel end assembly having a steering knuckle, a hub, and a deflector. The steering knuckle may have an opening that may extend around a spindle. The hub may be rotatably disposed on the spindle. The deflector may be disposed on the hub and may be at least partially disposed in the opening.

20 Claims, 5 Drawing Sheets

(56) References Cited

U.S. PATENT DOCUMENTS

| | | |
|---|---|---|
| 5,131,763 A | 7/1992 | Caron |
| 5,174,839 A | 12/1992 | Schultz et al. |
| 5,354,391 A | 10/1994 | Goodell et al. |
| 5,476,272 A | 12/1995 | Hixson |
| 5,695,289 A | 12/1997 | Ouchi |
| 5,893,648 A | 4/1999 | Smith |
| 6,145,558 A | 11/2000 | Schmitz |
| 6,186,667 B1 | 2/2001 | Nakamura |
| 6,196,639 B1 * | 3/2001 | Di Ponio ............... B60B 27/00 301/105.1 |
| 6,217,220 B1 | 4/2001 | Ohkuma et al. |
| 6,363,985 B1 | 4/2002 | Beesley |
| 6,457,869 B1 | 10/2002 | Smith |
| 6,634,648 B1 * | 10/2003 | Rockwell ........... F16C 33/7886 277/560 |
| 6,719,028 B2 | 4/2004 | D'Amico et al. |
| 6,994,136 B2 | 2/2006 | Stanczak |
| 7,455,459 B2 | 11/2008 | Toth |
| 7,690,412 B1 | 4/2010 | Jenkinson et al. |
| 7,931,061 B2 | 4/2011 | Gonska et al. |
| 8,020,676 B2 | 9/2011 | Bradley |
| 8,475,052 B2 | 7/2013 | Ostrander et al. |
| 8,616,254 B2 | 12/2013 | Kelley et al. |
| 8,777,241 B1 * | 7/2014 | Hamernik ............ B60B 35/003 280/93.512 |
| 8,915,274 B2 | 12/2014 | Eschenburg et al. |
| 9,221,395 B2 | 12/2015 | Honig et al. |
| 9,261,144 B2 | 2/2016 | Dutch |
| 9,481,213 B2 | 11/2016 | Keeney et al. |
| 9,539,865 B2 | 1/2017 | Lakin et al. |
| 2007/0211974 A1 | 9/2007 | Toth |
| 2009/0245935 A1 * | 10/2009 | Kamikawa ........... B60B 7/0013 403/359.1 |
| 2010/0225157 A1 * | 9/2010 | Kirby ................... F16D 31/02 301/131 |
| 2010/0285890 A1 * | 11/2010 | Dougherty ........... B60B 27/001 464/137 |
| 2011/0133046 A1 | 6/2011 | Lemerise et al. |
| 2012/0186714 A1 | 7/2012 | Richardson |
| 2012/0234447 A1 | 9/2012 | Narloch et al. |
| 2014/0239597 A1 | 8/2014 | White |
| 2015/0101722 A1 | 4/2015 | Lakin et al. |
| 2015/0107742 A1 | 4/2015 | Knapke |
| 2015/0137585 A1 | 5/2015 | Ono |
| 2016/0053840 A1 | 2/2016 | Hayford et al. |
| 2016/0059626 A1 | 3/2016 | Gemello |
| 2016/0159145 A1 * | 6/2016 | Nagata ................... F16D 1/072 29/898.07 |
| 2016/0318359 A1 | 11/2016 | Knapke et al. |
| 2017/0036693 A1 * | 2/2017 | Reid ...................... B62D 7/18 |
| 2018/0126782 A1 * | 5/2018 | Sinka ................. B60B 27/0052 |

FOREIGN PATENT DOCUMENTS

| | | |
|---|---|---|
| EP | 0822413 A2 | 7/1997 |
| EP | 2980432 A1 | 3/2014 |
| FR | 3001509 A1 | 8/2014 |
| JP | 2004169925 | 6/2004 |
| JP | 2008221864 A | 9/2008 |
| JP | 2012219971 A | 11/2012 |
| JP | 2014013073 A | 1/2014 |
| JP | 2017007528 A | 1/2017 |
| WO | 2013047695 A1 | 4/2013 |

OTHER PUBLICATIONS

United States Patent and Trademark Office, U.S. Appl. No. 15/346,792, filed Nov. 9, 2016.

Australian Government—IP Australia, Examination Report No. 1 for related Australian Application No. 2018203020, dated Feb. 14, 2019.

\* cited by examiner

WHEEL END ASSEMBLY HAVING A DEFLECTOR

TECHNICAL FIELD

This disclosure relates to a wheel end assembly having a deflector that may be disposed between a hub and a steering knuckle.

BACKGROUND

A wheel end assembly is disclosed in U.S. patent application Ser. No. 15/346,792.

SUMMARY

In at least one embodiment, a wheel end assembly is provided. The wheel end assembly may include a steering knuckle, a spindle, a hub, and a deflector. The steering knuckle may have an opening. The opening may extend around the spindle. The hub may be rotatable about an axis with respect to the spindle. The deflector may be disposed on the hub and may be at least partially disposed in the opening. The deflector may inhibit contaminants from passing through the opening.

In at least one embodiment, a wheel end assembly is provided. The wheel end assembly may include a steering knuckle, a spindle, a hub, and a deflector. The steering knuckle may have an inner surface. The inner surface may extend around an axis and may at least partially define an opening. The inner surface may extend in an axial direction further toward the hub above the axis than below the axis. The spindle may be received in the opening and may be fixedly positioned with respect to the steering knuckle. The hub may be disposed on the spindle and may be rotatable about the axis. The hub may have a mounting ring that may extend into the opening. The deflector may be disposed on the mounting ring and may be partially received in the opening.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
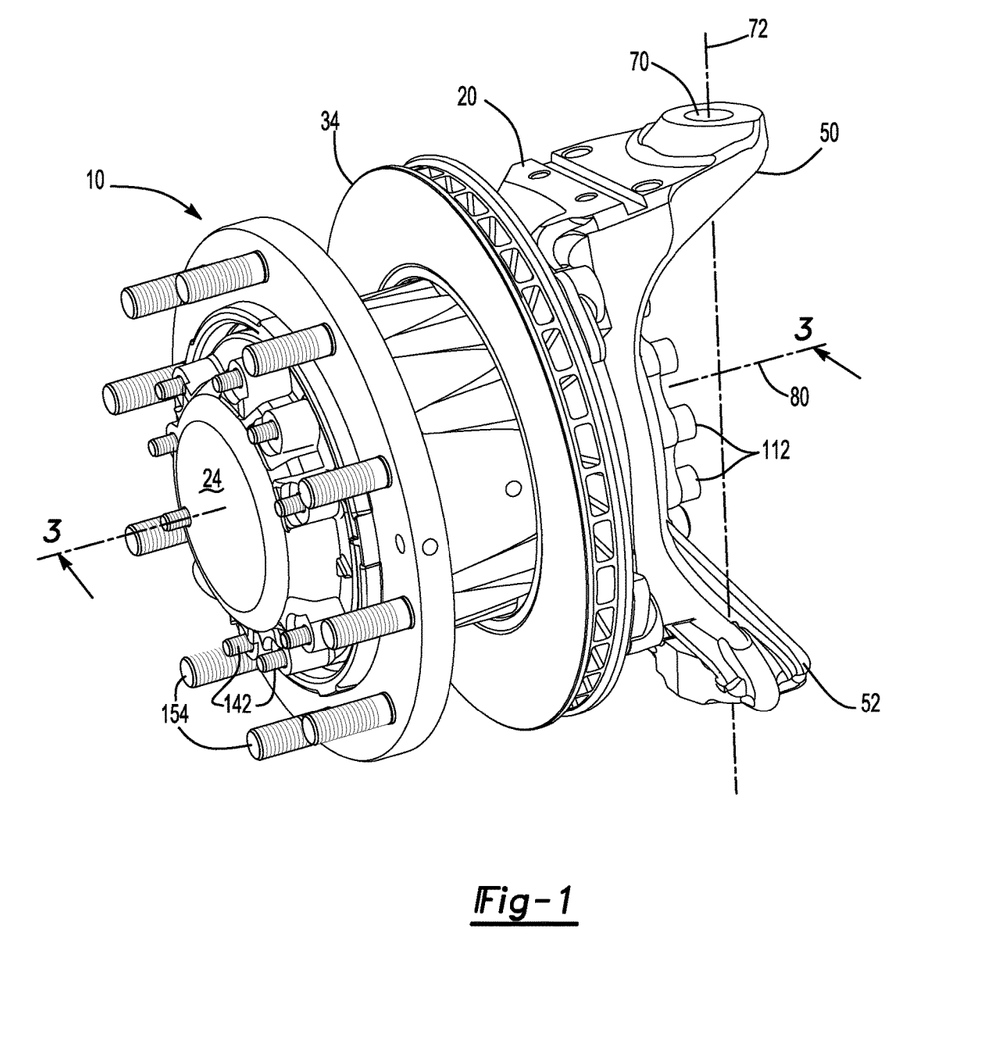
FIG. 1 is a perspective view of a wheel end assembly.

Referring to FIG. 1, an example of a wheel end assembly 10 is shown. The wheel end assembly 10 may be provided with a motor vehicle like a truck, bus, farm equipment, military transport or weaponry vehicle, or cargo loading equipment for land, air, or marine vessels or a trailer that may be provided with a motor vehicle.

The wheel end assembly 10 may be part of a drive axle or a non-drive axle. A drive axle may receive torque from a power source, such as an internal combustion engine or electric motor. In a drive axle configuration, an axle shaft may transmit torque to the wheel end assembly 10 to rotate a wheel that may be mounted on the wheel end assembly 10. For instance, the axle shaft may be operatively connected at a first end to a vehicle drivetrain component, like a differential or input shaft, and may be coupled to the wheel end assembly 10 at a second end. The axle shaft may be omitted in a non-drive axle configuration.

Figure 2:
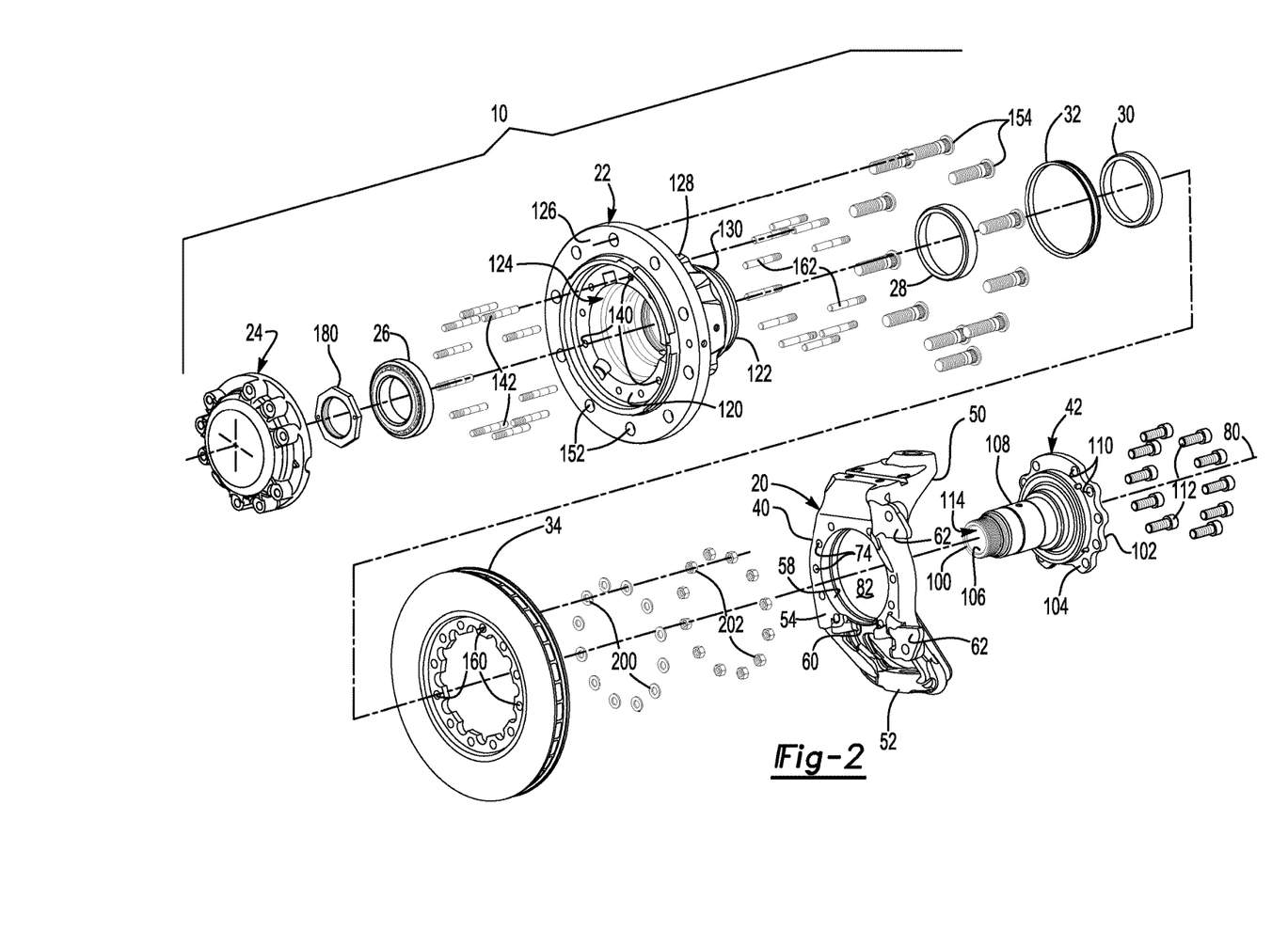
FIG. 2 is an exploded view of the wheel end assembly.

Referring to FIGS. 1 and 2, the wheel end assembly 10 may facilitate mounting and rotation of a vehicle wheel. The wheel end assembly 10 may include a steering knuckle 20, a hub 22, a hub cap 24, a first wheel bearing 26, a second wheel bearing 28, a seal assembly 30, a deflector 32, and a brake friction member 34.

Figure 3:
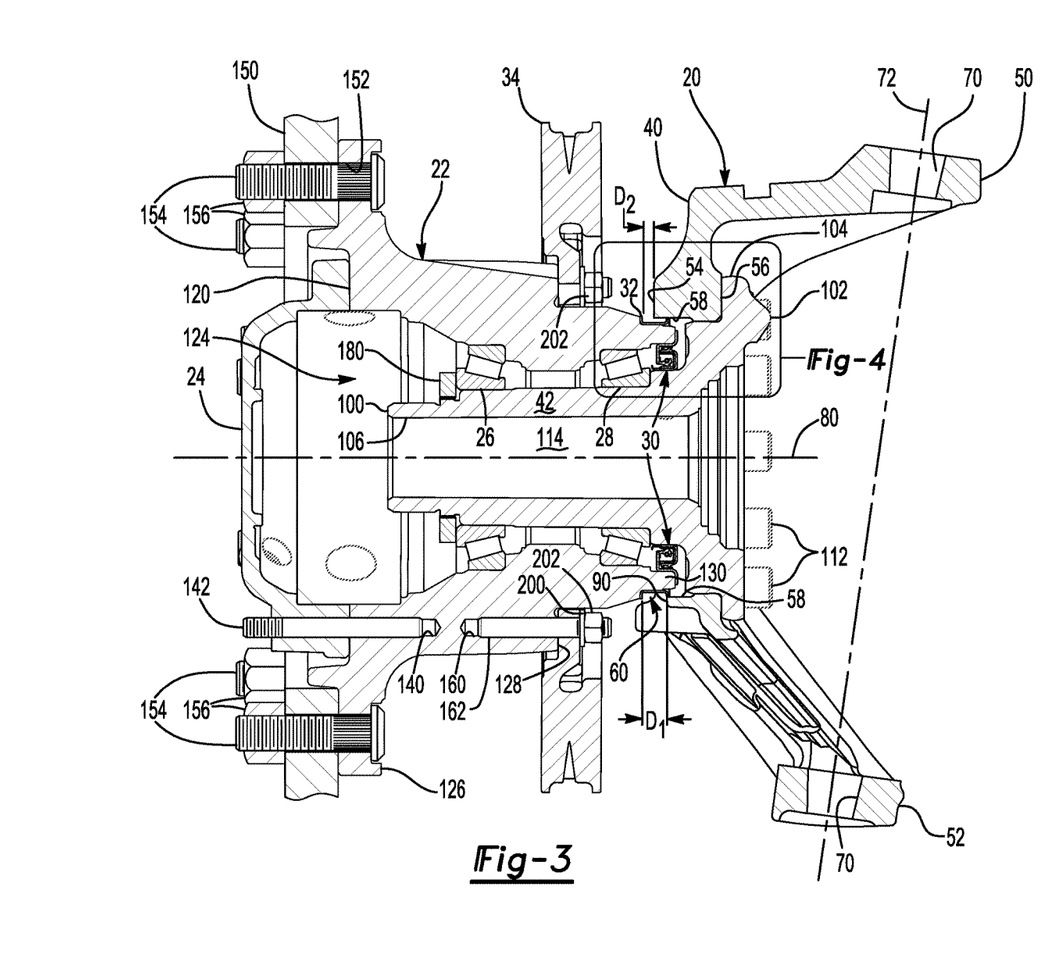
FIG. 3 is a section view of the wheel end assembly along section line 3-3 with the addition of a wheel that is mounted on a hub.

Referring to FIGS. 2 and 3, the steering knuckle 20 may be part of a steering system that may be used to steer or change the direction of the vehicle. The steering knuckle 20 may be pivotally disposed on a support member, such as an axle assembly or a vehicle suspension system. In at least one configuration, the steering knuckle 20 may include a steering knuckle body 40 and a spindle 42.

Figure 5:
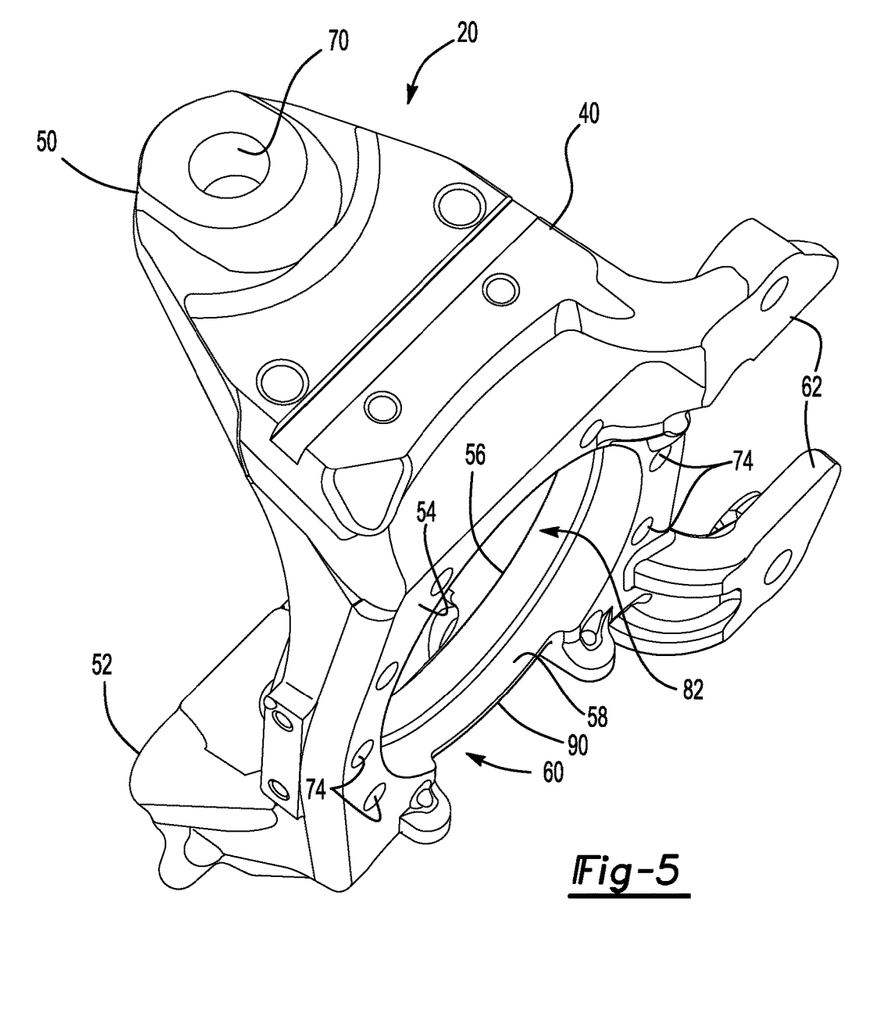
FIG. 5 is a perspective view of an example of a steering knuckle that may be provided with the wheel end assembly.

Referring to FIGS. 2, 3 and 5, the steering knuckle body 40 may facilitate mounting of various components to the steering knuckle 20. In at least one configuration, the steering knuckle body 40 may include a first arm 50, a second arm 52, an outboard side 54, an inboard side 56, an inner surface 58, a notch 60, and one or more brake mounts 62.

The first arm 50 may be disposed near the top of the steering knuckle body 40 and may extend away from the outboard side 54. The first arm 50 may include a kingpin hole 70 that may receive a kingpin that may couple the steering knuckle 20 to another vehicle component, such as an axle beam or linkage. As such, the steering knuckle 20 may pivot or rotate about the kingpin and a kingpin axis 72. The kingpin hole 70 may be a through hole that may extend through the first arm 50.

The second arm 52 may be disposed near the bottom of the steering knuckle body 40 and may also extend away from the outboard side 54. The second arm 52 may also include a kingpin hole 70 that may receive the kingpin.

Referring to FIG. 3, the outboard side 54 face toward the hub 22. As is best shown in FIGS. 2 and 5, a set of spindle mounting holes 74 may be provided in the outboard side 54. The spindle mounting holes 74 may be spaced apart from each other and may be radially disposed about an axis 80. Eight spindle mounting holes 74 are shown, but it is contemplated that a greater or lesser number may be provided. Moreover, the spindle mounting holes 74 may be omitted in various configurations, such as when the spindle 42 is integrally formed with the steering knuckle body 40. The spindle mounting holes 74 may extend from the outboard side 54 to the inboard side 56 and may be threaded.

The inboard side 56 may be disposed opposite the outboard side 54. As such, the inboard side 56 may face away from the hub 22. The inboard side 56 may engage the spindle 42 in one or more configurations.

Referring to FIGS. 2, 3 and 5, the inner surface 58 may extend around the axis 80. In addition, the inner surface 58 may at least partially define an opening 82 that may extend through the steering knuckle body 40. For example, the opening 82 may extend from the outboard side 54 toward or to the inboard side 56. The inner surface 58 or portion thereof may be radially disposed with respect to the axis 80.

The notch 60 may be disposed below the axis 80 and may be located near or at the bottom of the inner surface 58 and the opening 82. For example, the notch 60 or portion thereof may be disposed directly below the axis 80 as is best shown in FIGS. 2 and 3. The notch 60 may extend from the outboard side 54 toward the inboard side 56. For instance, the notch 60 may extend in an axial direction or in a direction that extends parallel to the axis 80 from the outboard side 54 to a notch end surface 90 as is best shown in FIGS. 3 and 5. The notch end surface 90 may face toward the hub 22 and be axially positioned between the outboard side 54 in the inboard side 56. In addition, the notch end surface 90 may be disposed substantially perpendicular to the axis 80 in one or more configurations.

Referring to FIGS. 2 and 5, one or more brake mounts 62 may be provided to facilitate mounting of a brake assembly to the steering knuckle 20. For example, the brake mounts 62 may facilitate mounting of a brake caliper to the steering knuckle 20. The brake mounts 62 may extend from the outboard side 54 and may be spaced apart from the opening 82. In FIGS. 2 and 5, the brake mounts 62 are integrally formed with the steering knuckle body 40; however, it is contemplated that the brake mounts 62 may be provided as separate components that may be fastened to the steering knuckle body 40.

Referring to FIGS. 2 and 3, the spindle 42 may rotatably support the hub 22. For example, the spindle 42 may support the first wheel bearing 26 and the second wheel bearing 28, which in turn may support and facilitate rotation of the hub 22 and an associated vehicle wheel. In addition, the spindle 42 may extend along or may be centered about the axis 80.

The spindle 42 may be received in the opening 82. As such, the opening 82 may extend around a portion of the spindle 42. In addition, the spindle 42 may be fixedly positioned with respect to the steering knuckle body 40. Accordingly, the spindle 42 may not rotate about the axis 80 or rotate with respect to the steering knuckle body 40. For instance, the spindle 42 may be integrally formed with the steering knuckle body 40 or may be a separate component that may be fixedly mounted to the steering knuckle body 40. In the configuration shown, the spindle 42 is separate from the steering knuckle body 40 and may include a first spindle end surface 100, a second spindle end surface 102, a spindle mounting flange 104, an internal surface 106, and an external surface 108.

The first spindle end surface 100 may be disposed at a free end or distal end of the spindle 42. The first spindle end surface 100 may be disposed inside the hub 22 and may face toward the hub cap 24.

The second spindle end surface 102 may be disposed opposite the first spindle end surface 100. The second spindle end surface 102 may be disposed proximate or adjacent to the steering knuckle body 40 in configurations where the spindle 42 is a separate component from the steering knuckle body 40. For instance, the second spindle end surface 102 may be disposed near the inboard side 56 of the steering knuckle body 40. The second spindle end surface 102 may be omitted in configurations where the spindle 42 is integrally formed with the steering knuckle 20.

The spindle mounting flange 104 may extend in an axial direction from the second spindle end surface 102 toward the first spindle end surface 100. In addition, the spindle mounting flange 104 may extend outwardly away or radially away from the axis 80 and may facilitate mounting of the spindle 42 to the steering knuckle body 40. For example, the spindle mounting flange 104 may include a plurality of mounting flange holes 110 that may extend through the spindle mounting flange 104 as is best shown in FIG. 2. The mounting flange holes 110 may be arranged around the axis 80 and may be aligned with corresponding spindle mounting holes 74. Each mounting flange hole 110 may receive a spindle mounting fastener 112, such as a bolt, that may couple the spindle 42 to the steering knuckle body 40. Each spindle mounting fastener 112 may be received in a corresponding spindle mounting hole 74 of the steering knuckle body 40.

Referring to FIGS. 2 and 3, the internal surface 106 may extend between the first spindle end surface 100 and the second spindle end surface 102. As is best shown in FIG. 3, the internal surface 106 may at least partially define a spindle hole 114. The axle shaft, if provided, may extend through the spindle hole 114. The internal surface 106 and the spindle hole 114 may optionally be omitted in a non-drive axle configuration.

The external surface 108 may be disposed opposite the internal surface 106. The external surface 108 may support the first wheel bearing 26 and the second wheel bearing 28 as will be discussed in more detail below.

Referring to FIGS. 2 and 3, the hub 22 may be rotatably disposed on the spindle 42. As such, the hub 22 may be rotatable about the axis 80 with respect to the spindle 42. In a drive axle configuration, the hub 22 may be operatively connected to an axle shaft. In at least one configuration, the hub 22 may have a first end surface 120, a second end surface 122, a hub cavity 124, a first hub mounting flange 126, a second hub mounting flange 128, and a mounting ring 130.

The first end surface 120 may face toward and may engage the hub cap 24. As is best shown in FIG. 2, the first end surface 120 may include a plurality of hub cap fastener holes 140. The hub cap fastener holes 140 may be arranged around the axis 80 and may receive a fastener 142, such as a mounting stud or a bolt, that may couple the hub cap 24 to the hub 22.

Figure 4:
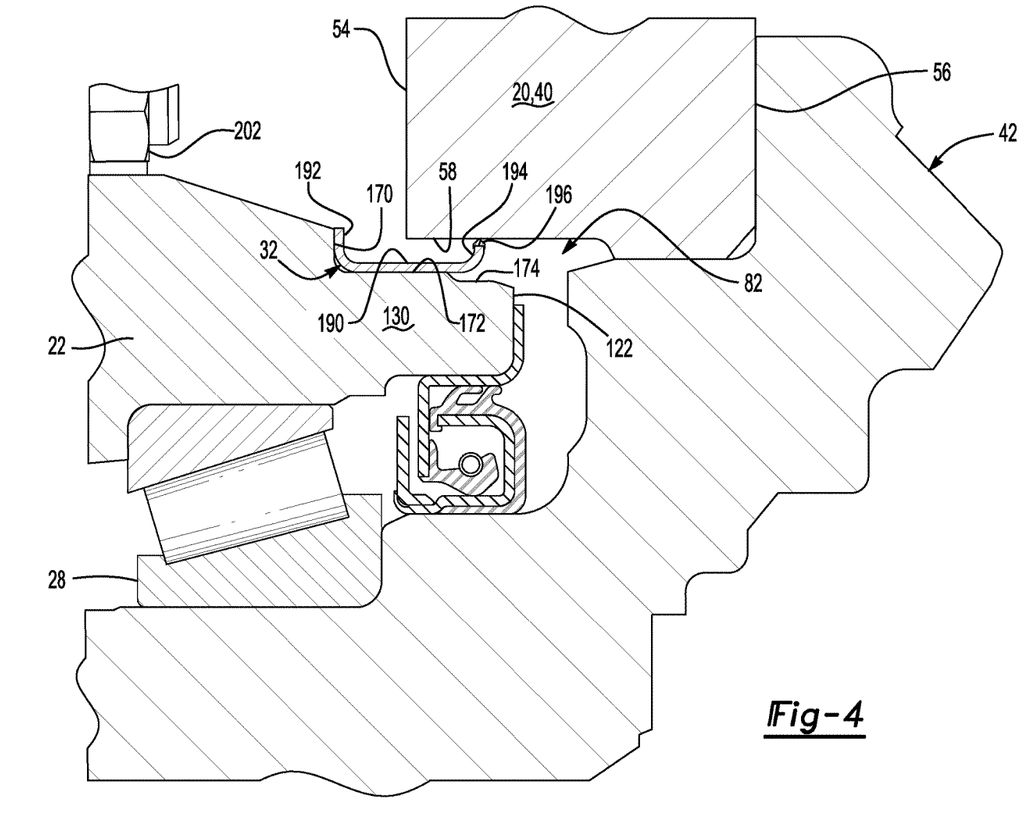
FIG. 4 is a magnified view of a portion of the wheel end assembly shown in FIG. 3.

Referring to FIGS. 2 and 4, the second end surface 122 may be disposed opposite the first end surface 120. The second end surface 122 may face away from the hub cap 24 and may face toward the steering knuckle 20. As is best shown in FIG. 4, the second end surface 122 may be received in the opening 82 of the steering knuckle body 40.

Referring to FIGS. 2 and 3, the hub cavity 124 may extend from the first end surface 120 to the second end surface 122. The hub cavity 124 may receive at least a portion of various components of the wheel end assembly 10, such as the spindle 42, first wheel bearing 26, and the second wheel bearing 28.

The first hub mounting flange 126 may be disposed near the first end surface 120. The first hub mounting flange 126 may extend away from the axis 80. For instance, the first hub mounting flange 126 may extend substantially perpendicular to the axis 80 in one or more configurations. The first hub mounting flange 126 may facilitate mounting of a wheel 150 that may support a tire. For example, the first hub mounting flange 126 may include a set of mounting lug fastener holes 152 that may each receive a wheel mounting lug 154. As is best shown in FIG. 3, the wheel 150 may have a wheel mounting flange that may have a set of holes that may be aligned with the wheel mounting lugs 154. A lug nut 156 may be threaded onto each wheel mounting lug 154 to secure the wheel 150 to the hub 22.

Referring to FIGS. 2 and 3, the second hub mounting flange 128 may be located near the center of the hub 22. For instance, the second hub mounting flange 128 may be axially positioned between the first end surface 120 and the second end surface 122. The second hub mounting flange 128 may facilitate mounting of the brake friction member 34 of a brake subsystem. For example, the second hub mounting flange 128 may include a set of fastener holes 160 as is best shown in FIG. 3. A fastener hole 160 may receive a brake friction member fastener 162, such as a mounting stud or bolt, that may facilitate mounting of the brake friction member 34 to the hub 22 such that the brake friction member 34 rotates with the hub 22.

Referring to FIGS. 2 and 4, the mounting ring 130 may be disposed at an end of the hub 22. For example, the mounting ring 130 may extend in an axial direction from the second end surface 122 toward the hub cap 24. Moreover, the second end surface 122 may define and may be referred to as an end surface of the mounting ring 130. The mounting ring 130 may extend around the axis 80 and may extend into the opening 82 of the steering knuckle body 40. In at least one configuration, the mounting ring 130 may have a step surface 170, a first outer surface 172, and a second outer surface 174.

Referring to FIG. 4, the step surface 170 may be disposed outside of the opening 82 and may face away from the hub cap 24 and toward the steering knuckle 20. The step surface 170 may be disposed substantially perpendicular to the axis 80. In addition, the step surface 170 may be axially positioned between the second end surface 122 and the second hub mounting flange 128 as is best shown with reference to FIGS. 3 and 4. The step surface 170 may facilitate positioning of the deflector 32 as will be discussed in more detail below.

The first outer surface 172 may extend from the step surface 170 to or toward the second end surface 122. The first outer surface 172 may extend continuously around the axis 80 and may be disposed at a substantially constant radial distance from the axis 80. The deflector 32 may be disposed on the first outer surface 172 as will be discussed in more detail below.

The second outer surface 174 may extend from the second end surface 122 to or toward the first outer surface 172. As is best shown in FIG. 4, the second outer surface 174 may be disposed opposite the seal assembly 30. The second outer surface 174 may extend continuously around the axis 80 and may be disposed a substantially constant radial distance from the axis 80. The second outer surface 174 may be disposed closer to the axis 80 than the first outer surface 172. The deflector 32 may be spaced apart from and may not engage the second outer surface 174. It is also contemplated that the second outer surface 174 may be omitted, such as when the first outer surface 172 extends to the second end surface 122.

Referring to FIGS. 2 and 3, the first wheel bearing 26 may be disposed on the spindle 42 and may rotatably support the hub 22. For example, the first wheel bearing 26 may be disposed on and may extend around the external surface 108 of the spindle 42 and may be received in the hub cavity 124. The first wheel bearing 26 may be positioned closer to the first spindle end surface 100 than the second wheel bearing 28.

The first wheel bearing 26 may have any suitable configuration. For instance, the first wheel bearing 26 may include a plurality of rolling elements, such as balls or rollers, that may be disposed between an inner race and an outer race. The inner race may be disposed on and may extend around the external surface 108 of the spindle 42. The outer race may be disposed on the hub 22 and may extend around the inner race.

The retaining nut 180 may help secure the first wheel bearing 26. More specifically, the retaining nut 180 may inhibit or limit axial movement of the first wheel bearing 26 along the spindle 42 in a direction that extends toward the first spindle end surface 100. For example, the retaining nut 180 may receive and may mate with corresponding threads on the spindle 42. The retaining nut 180 may engage the inner race of the first wheel bearing 26 and may be tightened to exert a preload force on the first wheel bearing 26.

The second wheel bearing 28 may also be disposed on the spindle 42 and may rotatably support the hub 22. For example, the second wheel bearing 28 may be disposed on and may extend around the external surface 108 of the spindle 42 and may be received in the hub cavity 124. The second wheel bearing 28 may be positioned closer to the second spindle end surface 102 than the first wheel bearing 26. The second wheel bearing 28 may have any suitable configuration. For instance, the second wheel bearing 28 may include a plurality of rolling elements, such as balls or rollers, that may be disposed between an inner race and an outer race.

Referring to FIGS. 2-4, the seal assembly 30 may be disposed between the hub 22 and the spindle 42. For example, the seal assembly 30 may extend continuously around the axis 80 and the spindle 42 and may extend from the spindle 42 to the hub 22. In addition, the seal assembly 30 may be axially positioned between the second wheel bearing 28 and the spindle 42. The seal assembly 30 may be completely or partially disposed inside the opening 82 of the steering knuckle body 40 and inside the hub cavity 124. The seal assembly 30 may help inhibit lubricant from exiting the hub cavity 124 between the spindle 42 and the hub 22. In addition, the seal assembly 30 may inhibit contaminants from entering the hub cavity 124.

The deflector 32 may be disposed on the hub 22 and may be at least partially disposed in the opening 82. For example, the deflector 32 may be fixedly positioned with respect to the hub 22 such that the deflector 32 and the hub 22 may rotate together about the axis 80 with respect to the steering knuckle 20. The deflector 32 may be configured as a ring that may extend continuously around the hub 22 and the axis 80. As is best shown in FIG. 4, the deflector 32 may have a generally U-shaped cross-section and may include a center portion 190, a first end portion 192, a second end portion 194, and a seal 196.

The center portion 190 may be disposed on the mounting ring 130 of the hub 22. In addition, center portion 190 may extend continuously around the mounting ring 130 and the axis 80. The center portion 190 may be disposed on the first outer surface 172 and may be radially disposed with respect to the axis 80. The center portion 190 may be spaced apart from and may not engage the second outer surface 174.

The first end portion 192 may extend from the center portion 190 in a direction that extends away from the axis 80. For example, the first end portion 192 may extend from a first end of the center portion 190 and may be disposed substantially perpendicular to the axis 80. The first end portion 192 may extend further from the axis 80 or may have a greater length than the second end portion 194. In addition, the first end portion 192 may not be received in the opening 82 of the steering knuckle body 40. The first end portion 192 may engage the hub 22. For example, the first end portion 192 may extend along and may engage the step surface 170. As such, the step surface 170 may inhibit axial movement of the deflector 32 in a direction that extends away from the steering knuckle body 40 and toward the hub cap 24.

The second end portion 194 may be disposed at an opposite end of the center portion 190 from the first end portion 192. The second end portion 194 may extend from the center portion 190 in a direction that extends away from the axis 80. For example, the second end portion 194 may extend from a second end of the center portion 190 that may be disposed opposite the first end. The second end portion 194 may be disposed substantially perpendicular to the axis 80. As such, the second end portion 194 may be disposed substantially parallel to the first end portion 192. The second end portion 194 may be received in the opening 82. Moreover, the second end portion 194 may be spaced apart from the steering knuckle 20 and the hub 22. For instance, the second end portion 194 may be received in the opening 82 of the steering knuckle body 40 and may extend toward but may not engage the inner surface 58 of the steering knuckle body 40. As such, the second end portion 194 may not inhibit rotation of the hub 22 with respect to the steering knuckle 20, but may at least partially fill the radial gap between hub 22 and the inner surface 58 to help block or inhibit contaminants, such as particulates like dirt and pebbles and/or liquids, from passing through the opening 82 or passing between the deflector and the inner surface 58 of the steering knuckle body 40.

Referring to FIG. 3, axial positioning of the deflector 32 with respect to the steering knuckle 20 is shown in more detail. In FIG. 3, the inner surface 58 of the steering knuckle body 40 extends in an axial direction further toward the hub 22 above the axis 80 than below the axis 80. More specifically, the inner surface 58 may have a shorter axial length where the notch 60 is provided in the steering knuckle body 40 than an axial length where the notch 60 is not provided in the steering knuckle body 40. As such, the axial distance $D_1$ from the step surface 170 of the hub 22 to the notch end surface 90 may be greater than the axial distance $D_2$ from the step surface 170 of the hub 22 to the outboard side 54. As such, the first end portion 192 of the deflector 32 may also be disposed further from the notch end surface 90 than from the outboard side 54. Such a configuration may allow contaminants that are received in or captured by the U-shaped cross-section of the deflector 32 to more freely exit the wheel end assembly 10 via the notch 60. As such, the deflector 32 may be "self-cleaning" as contaminants that are captured by the deflector 32 may be released or flung off the deflector 32 as the hub 22 rotates and may exit the opening 82 via the notch 60.

Referring to FIG. 4, the seal 196 may optionally be provided on the deflector 32. For example, the seal 196 may be disposed at an end of the second end portion 194 that may be disposed opposite the center portion 190. The seal 196 may extend continuously around the axis 80 and the second end portion 194. The seal 196 may extend from the second end portion 194 to the inner surface 58 of the steering knuckle body 40. As such, the seal 196 may contact the inner surface 58 to help further block or inhibit contaminants from passing around the deflector 32 to reach the seal assembly 30 or pass around the seal assembly 30 to contaminate the lubricant in the wheel end assembly 10, which may lead to wear and reduced component life. The seal 196 may be made of any suitable material, such as a polymeric or an elastomeric material like rubber.

Referring to FIG. 1, the brake friction member 34 may be part of a brake subsystem that may brake an associated wheel. The brake subsystem may have any suitable configuration. For instance, the brake subsystem may be configured as a friction brake, such as a disc brake or a drum brake. In FIG. 1, a portion of the brake subsystem is shown that has a disc brake configuration. In such a configuration, the brake friction member 34 may be a brake rotor. The brake friction member 34 may be configured as a brake drum when the brake subsystem is configured as a drum brake. One or more brake pads may be actuated into engagement with the brake friction member 34 to slow rotation of the hub 22 and the wheel 150 about the axis 80.

Referring to FIGS. 2 and 3, the brake friction member 34 may be fixedly disposed on the hub 22 by way of the brake friction member fasteners 162. In at least one configuration, a washer 200 and a nut 202 may be disposed on the brake friction member fasteners 162 to secure the brake friction member 34. As is best shown in FIG. 3, the brake friction member 34 may be axially positioned such that the brake friction member 34 extends around the hub 22 and may generally be positioned between the first wheel bearing 26 and the second wheel bearing 28.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A wheel end assembly comprising:
   a steering knuckle having an opening that extends around a spindle;
   a hub that is rotatable about an axis with respect to the spindle; and
   a deflector that is disposed on the hub and that is at least partially disposed in the opening, wherein the deflector inhibits contaminants from passing through the opening and the deflector is fixedly positioned with respect to the hub such that the deflector and the hub are rotatable about the axis with respect to the steering knuckle and the spindle.

2. The wheel end assembly of claim 1 wherein the deflector extends continuously around the hub.

3. A wheel end assembly comprising:
   a steering knuckle having an opening that extends around a spindle;
   a hub that is rotatable about an axis with respect to the spindle; and
   a deflector that is disposed on the hub and that is at least partially disposed in the opening, wherein the deflector inhibits contaminants from passing through the opening and the deflector extends around a seal assembly that extends from the spindle to the hub.

4. A wheel end assembly comprising:
   a steering knuckle having an opening that extends around a spindle;
   a hub that is rotatable about an axis with respect to the spindle; and
   a deflector that is disposed on the hub and that is at least partially disposed in the opening, wherein the deflector inhibits contaminants from passing through the opening, has a U-shaped cross-section, and includes a center portion that is radially disposed with respect to the axis, a first end portion that extends from the center portion away from the axis, and a second end portion that extends from the center portion away from the axis.

5. The wheel end assembly of claim 4 wherein the first end portion and the second end portion are disposed at opposite ends of the center portion.

6. The wheel end assembly of claim 4 wherein the first end portion is disposed substantially parallel to the second end portion.

7. The wheel end assembly of claim 4 wherein the first end portion extends further from the axis than the second end portion.

8. The wheel end assembly of claim 4 wherein the first end portion engages the hub.

9. The wheel end assembly of claim 4 wherein the second end portion is received in the opening and is spaced apart from the hub.

10. The wheel end assembly of claim 9 wherein the second end portion is spaced apart from and does not engage the steering knuckle.

11. The wheel end assembly of claim 9 wherein the deflector further comprises a seal that is disposed on the second end portion.

12. The wheel end assembly of claim 11 wherein the seal extends from the second end portion to the steering knuckle.

13. A wheel end assembly comprising:
a steering knuckle having an inner surface that extends around an axis and at least partially defines an opening;
a spindle that is received in the opening and is fixedly positioned with respect to the steering knuckle;
a hub that is disposed on the spindle and is rotatable around the axis, wherein the hub has a mounting ring that extends into the opening; and
a deflector that is disposed on the mounting ring and is partially received in the opening, wherein the inner surface extends in an axial direction further toward the hub above the axis than below the axis.

14. The wheel end assembly of claim 13 wherein the mounting ring has an end surface that is received in the opening and that faces toward the spindle, a step surface that is disposed outside the opening and that faces toward the spindle, and a first outer surface that extends from the step surface toward the end surface, wherein the deflector is disposed on the step surface and the first outer surface.

15. The wheel end assembly of claim 14 wherein the deflector includes a center portion that is disposed on the first outer surface, a first end portion that extends from the center portion away from the axis and is disposed on the step surface, and a second end portion that is disposed opposite the first end portion and extends away from the axis.

16. The wheel end assembly of claim 15 wherein the first end portion is not received in the opening and the second end portion is received in the opening.

17. The wheel end assembly of claim 15 wherein the mounting ring further comprises a second outer surface that extends from the end surface toward the first outer surface, wherein the deflector is spaced apart from and does not engage the second outer surface.

18. The wheel end assembly of claim 15 wherein the deflector has a seal that is disposed at an end of the second end portion and that engages the inner surface.

19. The wheel end assembly of claim 14 wherein the steering knuckle includes an inboard side, an outboard side disposed opposite the inboard side, and a notch, wherein the opening extends from the inboard side to the outboard side and the notch is disposed below the axis and extends from the outboard side toward the inboard side.

20. The wheel end assembly of claim 19 wherein the notch has a notch end surface that faces toward the hub and is disposed between the inboard side and the outboard side, wherein the notch end surface is disposed further from the step surface than the outboard side.

\* \* \* \* \*